United States Patent
Zheng et al.

(10) Patent No.: US 11,167,273 B2
(45) Date of Patent: Nov. 9, 2021

(54) CATALYTIC COMPOSITES COMPRISING NB2O5/CEO2 SCR COMPONENT

(71) Applicant: BASF Corporation, Florham Park, NJ (US)

(72) Inventors: Xiaolai Zheng, Princeton Junction, NJ (US); Patrick Burk, Freehold, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/652,875

(22) PCT Filed: Oct. 2, 2018

(86) PCT No.: PCT/IB2018/057650
§ 371 (c)(1),
(2) Date: Apr. 1, 2020

(87) PCT Pub. No.: WO2019/069232
PCT Pub. Date: Apr. 11, 2019

(65) Prior Publication Data
US 2020/0290022 A1 Sep. 17, 2020

Related U.S. Application Data (60) Provisional application No. 62/567,330, filed on Oct. 3, 2017.

(51) Int. Cl.
*B01J 23/83* (2006.01)
*B01J 23/20* (2006.01)
(Continued)

(52) U.S. Cl.
CPC ............... *B01J 23/83* (2013.01); *B01J 23/20* (2013.01); *B01J 23/30* (2013.01); *B01J 23/34* (2013.01);
(Continued)

(58) Field of Classification Search
CPC ... B01J 23/20; B01J 23/83; B01J 23/44; B01J 35/0006; B01J 35/04
(Continued)

(56) References Cited

U.S. PATENT DOCUMENTS 7,758,834 B2   7/2010   Chen et al.
8,017,097 B1   9/2011   Southward et al.
(Continued)

FOREIGN PATENT DOCUMENTS

EP    2368628 A1    9/2011
WO    WO-2016/201276 A1    12/2016

OTHER PUBLICATIONS

International Search Report dated Jan. 22, 2019 in PCT/IB2018/057650 filed on Oct. 2, 2018.
(Continued)

*Primary Examiner* — Tom P Duong
(74) *Attorney, Agent, or Firm* — Finnegan, Henderson, Farabow, Garrett & Dunner LLP (57) ABSTRACT

The present disclosure provides SCR catalyst compositions, catalyst articles, and catalyst systems, as well as methods of reducing the amount of NOx present in an engine exhaust gas, particularly exhaust from a gasoline engine. The catalyst compositions particularly can comprise a doped ceria substrate, particularly a ceria support doped with at least a niobia component, and optionally further doped with a further material, particularly a base metal oxide (BMO).

32 Claims, 3 Drawing Sheets

(51) Int. Cl.

| | |
|---|---|
| *B01J 23/30* | (2006.01) |
| *B01J 23/34* | (2006.01) |
| *B01J 23/44* | (2006.01) |
| *B01J 23/46* | (2006.01) |
| *B01J 35/00* | (2006.01) |
| *B01J 35/04* | (2006.01) |
| *F01N 3/10* | (2006.01) |
| *F01N 3/20* | (2006.01) |
| *F01N 3/28* | (2006.01) |

(52) U.S. Cl.
CPC ............ *B01J 23/44* (2013.01); *B01J 23/464* (2013.01); *B01J 35/0006* (2013.01); *B01J 35/04* (2013.01); *F01N 3/101* (2013.01); *F01N 3/2066* (2013.01); *F01N 3/28* (2013.01); *F01N 2370/02* (2013.01)

(58) Field of Classification Search
USPC ........................................................ 422/171
See application file for complete search history.

(56) References Cited

U.S. PATENT DOCUMENTS

| | | | |
|---|---|---|---|
| 8,529,853 | B2 | 9/2013 | Southward et al. |
| 8,734,742 | B2 | 5/2014 | Hernandez et al. |
| 9,138,725 | B2 | 9/2015 | Hoke et al. |
| 9,555,371 | B2 | 1/2017 | Fisher et al. |
| 9,931,596 | B2 | 4/2018 | Zheng et al. |
| 2009/0193796 | A1* | 8/2009 | Wei ........................ F01N 3/0814 60/297 |
| 2011/0236282 | A1 | 9/2011 | Southward et al. |
| 2011/0271664 | A1 | 11/2011 | Boorse et al. |
| 2012/0294792 | A1 | 11/2012 | Southward et al. |
| 2013/0121902 | A1 | 5/2013 | Adelmann et al. |
| 2013/0189172 | A1 | 7/2013 | Spurk et al. |
| 2013/0195743 | A1 | 8/2013 | Hernandez et al. |
| 2014/0041366 | A1* | 2/2014 | Seyler .................. B01J 37/0244 60/274 |
| 2014/0044629 | A1 | 2/2014 | Bisson et al. |
| 2014/0271427 | A1* | 9/2014 | Hoke .................. B01D 53/9413 423/213.5 |
| 2015/0182912 | A1 | 7/2015 | Fisher et al. |
| 2017/0274321 | A1 | 9/2017 | Zheng et al. |

OTHER PUBLICATIONS

International Preliminary Report on Patentability dated Apr. 8, 2020 in PCT/IB2018/057650, 8 pages.
Casapu, et al., "Characterization of Nb-Containing MnOx—CeO2 Catalyst for Low-Temperature Selective Catalytic Reduction of NO with NH3", The Journal of Physical Chemistry C, vol. 114, Issue 21, May 12, 2010, pp. 9791-9801.
European Search Report for EP Patent Application No. 18863893.6, dated May 25, 2021, 3 pages.
U.S. Appl. No. 16/487,447, filed Aug. 21, 2019, US 2020/0055035 A1, Xiaolai Zheng, et al.

* cited by examiner

CATALYTIC COMPOSITES COMPRISING NB2O5/CEO2 SCR COMPONENT

FIELD OF THE INVENTION

The present invention relates generally to the field of selective catalytic reduction catalysts and to methods of preparing and using such catalysts to selectively reduce nitrogen oxides.

BACKGROUND OF THE INVENTION

Over time, the harmful components of nitrogen oxides ($NO_x$) have led to atmospheric pollution. $NO_x$ is contained in exhaust gases, such as from internal combustion engines (e.g., in automobiles and trucks), from combustion installations (e.g., power stations heated by natural gas, oil, or coal), and from nitric acid production plants.

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a lower hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

The selective reduction process is referred to as a SCR (Selective Catalytic Reduction) process. The SCR process uses catalytic reduction of nitrogen oxides with a reductant (e.g., ammonia) in the presence of atmospheric oxygen, resulting in the formation predominantly of nitrogen and steam:

| | |
|---|---|
| $4NO + 4NH_3 + O_2 \rightarrow 4N_2 + 6H_2O$ | (standard SCR reaction) |
| $2NO_2 + 4NH_3 \rightarrow 3N_2 + 6H_2O$ | (slow SCR reaction) |
| $NO + NO_2 + NH_3 \rightarrow 2N_2 + 3H_2O$ | (fast SCR reaction) |

Catalysts employed in the SCR process ideally should be able to retain good catalytic activity over a wide range of temperature conditions of use, for example, 200° C. to 600° C. or higher, under hydrothermal conditions. SCR catalysts are commonly employed in hydrothermal conditions, such as during the regeneration of a soot filter, a component of the exhaust gas treatment system used for the removal of particles.

Molecular sieves such as zeolites have been used in the selective catalytic reduction of nitrogen oxides with a reductant such as ammonia, urea, or a hydrocarbon in the presence of oxygen. Zeolites are crystalline materials having rather uniform pore sizes which, depending upon the type of zeolite and the type and amount of cations included in the zeolite lattice, range from about 3 to about 10 Angstroms in diameter. Certain zeolites having 8-ring pore openings and double-six ring secondary building units, particularly those having cage-like structures, have been used as SCR catalysts. A specific type of zeolite having these properties is chabazite (CHA), which is a small pore zeolite with 8 member-ring pore openings (~3.8 Angstroms) accessible through its 3-dimensional porosity. A cage-like structure results from the connection of double six-ring building units by 4 rings.

Metal-promoted zeolite catalysts also often referred to as ion-exchanged zeolites or zeolites supported with copper and/or iron including, among others, copper-promoted and iron-promoted zeolite catalysts, for the selective catalytic reduction of nitrogen oxides with ammonia are known and can typically be prepared via metal ion-exchange processes. For example, iron-promoted zeolite beta has been an effective commercial catalyst for the selective reduction of nitrogen oxides with ammonia.

Metal-promoted zeolite catalysts are effective NOx abatement catalysts for use with diesel-fueled engines and even for use with so-called three way conversion (TWC) catalyst applications up to a temperature of 900° C. This, however, presents a temperature limitation since applications requiring temperatures greater than 900° C., such as with aging of a close-coupled catalyst in a TWC system, are known to destroy zeolite materials.

In the exhaust of a gasoline-fueled vehicle, a moderate amount of ammonia exists as a result of over reduction of NOx on TWC catalysts. A catalyst system comprising a TWC catalyst and an SCR catalyst (a so-called TWC+SCR system) is thus known for further abatement of NOx via a passive $NH_3$-SCR route. As noted above, however, zeolite based SCR catalysts cannot survive typical TWC aging conditions with a temperature inevitably higher than 900° C. under frequent lean/rich transitions. Accordingly, there remains a need for a non-zeolite based SCR catalyst component that is resistant to harsh TWC aging environments.

SUMMARY OF THE INVENTION

The present disclosure provides non-zeolitic SCR catalyst compositions, catalyst articles, and catalyst systems, as well as methods of reducing the amount of NOx present in an engine exhaust gas, particularly exhaust from a gasoline engine or a lean gasoline direct injection (GDI) engine. The catalyst compositions particularly can comprise a doped ceria substrate, particularly a ceria support doped with at least a niobia component, and optionally further doped with a further material, particularly a base metal oxide (BMO). The catalyst articles particularly can comprise a catalyst composition as described herein coated on a catalyst substrate (e.g., a flow through filter or wall flow filter) and/or a catalyst composition as described herein in a monolithic form. The catalyst composition can be included in a multi-coated article, wherein the catalyst composition is provided as a first coating with a second coating including a BMO or a platinum group metal (PGM). The catalyst systems particularly can comprise a TWC catalyst combined with a catalyst article as otherwise described herein.

In one or more embodiments, the present disclosure can relate specifically to an SCR catalyst. For example, an SCR catalyst composition according to the present disclosure can comprise a ceria support including a first dopant that is niobia and a second dopant that is a base metal oxide (BMO). As a further example, an SCR catalyst composition according to the present disclosure can comprise a ceria support including a first dopant that is niobia and an optional second dopant that is a base metal oxide (BMO), wherein the ceria support comprises about 10% to about 95% by weight ceria and about 5% to about 90% by weight of a further metal oxide. In further embodiments, the present SCR catalyst composition can be defined in relation to one or more of the following statements, which can be combined in any number and order.

The BMO can be selected from the group consisting of lanthanum oxide, praseodymium oxide, neodymium oxide, yttrium oxide, titanium dioxide, tungsten oxide, iron oxide, copper oxide, manganese oxide, nickel oxide, magnesium oxide, barium oxide, and combinations thereof.

The BMO can be selected from the group consisting of lanthanum oxide, praseodymium oxide, neodymium oxide, yttrium oxide, tungsten oxide, and combinations thereof.

The niobia can comprise about 0.1 to about 20% by weight of the SCR catalyst composition.

The second dopant can comprise about 0.1 to about 20% by weight of the SCR catalyst composition.

The ceria support can comprise at least 99% by weight ceria.

The ceria support can comprise about 10% to about 95% by weight ceria and about 5% to about 90% by weight of a further metal oxide.

The further metal oxide that optionally can be combined with the ceria support can be aluminum oxide.

In one or more embodiments, the present disclosure can relate specifically to a catalyst article. For example, a catalyst article according to the present disclosure can comprise a catalyst substrate having a plurality of channels adapted for gas flow, each channel having a wall surface in adherence to a catalytic coating comprising a catalyst composition as otherwise described herein. In further embodiments, the present catalyst article can be defined in relation to one or more of the following statements, which can be combined in any number and order.

The catalyst substrate can be a honeycomb comprising a wall flow filter substrate or a flow through substrate.

The catalytic coating can be present on the substrate with a loading of at least about 1.0 g/in$^3$.

The catalyst article further can comprise a platinum group metal (PGM).

In one or more embodiments, the present disclosure can relate specifically to an emission treatment system for treatment of an exhaust gas stream. For example, an emission treatment system according to the present disclosure can comprise: i. an engine producing an exhaust gas stream; ii. a three-way catalyst positioned downstream from the engine and in fluid communication with the exhaust stream; and iii. an SCR catalyst article positioned downstream from the three-way catalyst and in fluid communication with the exhaust stream, the SCR catalyst article comprising a catalyst substrate having a plurality of channels adapted for gas flow, each channel having a wall surface in adherence to a catalytic coating comprising a ceria support doped with niobia. In further embodiments, the present emission treatment system can be defined in relation to one or more of the following statements, which can be combined in any number and order.

The SCR catalyst article can be substantially free of platinum group metal (PGM).

The SCR catalyst article can include a platinum group metal (PGM).

The PGM can be present on the catalyst substrate with a loading of at least about 0.5 g/ft$^3$.

The PGM can be present on the catalyst substrate with a loading of about 0.5 g/ft$^3$ to about 20 g/ft$^3$.

The catalytic coating further can comprise boehmite.

The ceria support of the catalytic coating of the SCR catalyst article can comprise at least 99% by weight ceria.

The ceria support of the catalytic coating of the SCR catalyst article can comprise about 10% to about 95% by weight ceria and about 5% to about 90% by weight of a further metal oxide.

The further metal oxide can be aluminum oxide.

The catalytic coating of the SCR catalyst article can comprise a further dopant that is a base metal oxide (BMO).

The BMO can be selected from the group consisting of lanthanum oxide, praseodymium oxide, neodymium oxide, yttrium oxide, titanium dioxide, tungsten oxide, iron oxide, copper oxide, manganese oxide, nickel oxide, magnesium oxide, barium oxide, and combinations thereof.

The BMO can be selected from the group consisting of lanthanum oxide, praseodymium oxide, neodymium oxide, yttrium oxide, tungsten oxide, and combinations thereof.

The catalytic coating comprising the ceria support doped with niobia can be in a first coating layer, and the catalyst substrate of the SCR catalyst article can include a second catalytic coating layer.

The second catalytic coating layer can comprise a base metal oxide (BMO).

The second catalytic coating layer can comprise a platinum group metal (PGM).

The PGM can be present on the catalyst substrate with a loading of at least about 0.5 g/ft$^3$.

The PGM can be present on the catalyst substrate with a loading of about 0.5 g/ft$^3$ to about 20 g/ft$^3$.

The first coating layer can be a top layer.

The first coating layer can be a bottom layer.

The present application includes, without limitation, the following embodiments.

Embodiment 1

An SCR catalyst composition comprising a ceria support including a first dopant that is niobia and a second dopant that is a base metal oxide (BMO).

Embodiment 2

An SCR catalyst composition comprising a ceria support including a first dopant that is niobia and an optional second dopant that is a base metal oxide (BMO), wherein the ceria support comprises about 10% to about 95% by weight ceria and about 5% to about 90% by weight of a further metal oxide.

Embodiment 3

The SCR catalyst composition of any preceding embodiment, wherein the BMO is selected from the group consisting of lanthanum oxide, praseodymium oxide, neodymium oxide, yttrium oxide, titanium dioxide, tungsten oxide, iron oxide, copper oxide, manganese oxide, nickel oxide, magnesium oxide, barium oxide, and combinations thereof.

Embodiment 4

The SCR catalyst composition of any preceding embodiment, wherein the BMO is selected from the group consisting of lanthanum oxide, praseodymium oxide, neodymium oxide, yttrium oxide, tungsten oxide, and combinations thereof.

Embodiment 5

The SCR catalyst composition of any preceding embodiment, wherein the niobia comprises about 0.1 to about 20% by weight of the SCR catalyst composition.

Embodiment 6

The SCR catalyst composition of any preceding embodiment, wherein the second dopant comprises about 0.1 to about 20% by weight of the SCR catalyst composition.

Embodiment 7

The SCR catalyst composition of any preceding embodiment, wherein the ceria support comprises at least 99% by weight ceria.

Embodiment 8

The SCR catalyst composition of any preceding embodiment, wherein the ceria support comprises about 10% to about 95% by weight ceria and about 5% to about 90% by weight of a further metal oxide.

Embodiment 9

The SCR catalyst composition of any preceding embodiment, wherein the further metal oxide is aluminum oxide.

Embodiment 10

A catalyst article comprising a catalyst substrate having a plurality of channels adapted for gas flow, each channel having a wall surface in adherence to a catalytic coating comprising a catalyst composition according to any preceding embodiment.

Embodiment 11

The catalyst article of any preceding embodiment, wherein the catalyst substrate is a honeycomb comprising a wall flow filter substrate or a flow through substrate.

Embodiment 12

The catalyst article of any preceding embodiment, wherein the catalytic coating is present on the substrate with a loading of at least about 1.0 g/in$^3$.

Embodiment 13

The catalyst article of any preceding embodiment, further comprising a platinum group metal (PGM).

Embodiment 14

An emission treatment system for treatment of an exhaust gas stream, the emission treatment system comprising: i. an engine producing an exhaust gas stream; ii. a three-way catalyst positioned downstream from the engine and in fluid communication with the exhaust stream; and iii. an SCR catalyst article positioned downstream from the three-way catalyst and in fluid communication with the exhaust stream, the SCR catalyst article comprising a catalyst substrate having a plurality of channels adapted for gas flow, each channel having a wall surface in adherence to a catalytic coating comprising a ceria support doped with niobia.

Embodiment 15

The emission treatment system of any preceding embodiment, wherein the SCR catalyst article is substantially free of platinum group metal (PGM).

Embodiment 16

The emission treatment system of any preceding embodiment, wherein the SCR catalyst article includes a platinum group metal (PGM).

Embodiment 17

The emission treatment system of any preceding embodiment, wherein the PGM is present on the catalyst substrate with a loading of at least about 0.5 g/ft$^3$.

Embodiment 18

The emission treatment system of any preceding embodiment, wherein the PGM is present on the catalyst substrate with a loading of about 0.5 g/ft$^3$ to about 20 g/ft$^3$.

Embodiment 19

The emission treatment system of any preceding embodiment, wherein the catalytic coating further comprises boehmite.

Embodiment 20

The emission treatment system of any preceding embodiment, wherein the ceria support of the catalytic coating of the SCR catalyst article comprises at least 99% by weight ceria.

Embodiment 21

The emission treatment system of any preceding embodiment, wherein the ceria support of the catalytic coating of the SCR catalyst article comprises about 10% to about 95% by weight ceria and about 5% to about 90% by weight of a further metal oxide.

Embodiment 22

The emission treatment system of any preceding embodiment, wherein the further metal oxide is aluminum oxide.

Embodiment 23

The emission treatment system of any preceding embodiment, wherein the catalytic coating of the SCR catalyst article comprises a further dopant that is a base metal oxide (BMO).

Embodiment 24

The emission treatment system of any preceding embodiment, wherein the BMO is selected from the group consisting of lanthanum oxide, praseodymium oxide, neodymium oxide, yttrium oxide, titanium dioxide, tungsten oxide, iron oxide, copper oxide, manganese oxide, nickel oxide, magnesium oxide, barium oxide, and combinations thereof.

Embodiment 25

The emission treatment system of any preceding embodiment, wherein the BMO is selected from the group consist-

Embodiment 26

The emission treatment system of any preceding embodiment, wherein the catalytic coating comprising the ceria support doped with niobia is in a first coating layer, and wherein the catalyst substrate of the SCR catalyst article includes a second catalytic coating layer.

Embodiment 27

The emission treatment system of any preceding embodiment, wherein the second catalytic coating layer comprises a base metal oxide (BMO).

Embodiment 28

The emission treatment system of any preceding embodiment, wherein the second catalytic coating layer comprises a platinum group metal (PGM).

Embodiment 29

The emission treatment system of any preceding embodiment, wherein PGM is present on the catalyst substrate with a loading of at least about 0.5 $g/ft^3$.

Embodiment 30

The emission treatment system of any preceding embodiment, wherein the PGM is present on the catalyst substrate with a loading of about 0.5 $g/ft^3$ to about 20 $g/ft^3$.

Embodiment 31

The emission treatment system of any preceding embodiment, wherein the first coating layer is a top layer.

Embodiment 32

The emission treatment system of any preceding embodiment, wherein the first coating layer is a bottom layer.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present disclosure generally provides catalysts, catalyst articles and catalyst systems comprising such catalyst articles. In particular, such articles and systems comprise an SCR catalyst composition, which is effective for the selective reduction of nitrogen oxides in the presence of a reductant and a catalyst. The catalyst is particularly configured to remain stable even under high temperature conditions—e.g., aging at temperatures greater than 900° C.

The following terms shall have, for the purposes of this application, the respective meanings set forth below.

As used herein, the term "selective catalytic reduction" (SCR) refers to the catalytic process of reducing oxides of nitrogen to dinitrogen ($N_2$) using a nitrogenous reductant (e.g., ammonia, urea, and the like).

As used herein, the term "catalyst" or "catalyst composition" refers to a material that promotes a reaction.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

As used herein, the term "substrate" refers to the monolithic material onto which the catalyst composition is placed, typically in the form of a washcoat containing a plurality of particles containing a catalytic composition thereon. A washcoat is formed by preparing slurry containing a certain solid content (e.g., 10-80% by weight) of particles in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

As used herein, the term "catalyst article" refers to an element that is used to promote a desired reaction. For example, a catalyst article may comprise a washcoat containing catalytic compositions on a substrate.

The term "abate" means to decrease in amount and "abatement" means a decrease in the amount, caused by any means.

A catalyst composition according to the present disclosure is particularly configured for use as selective catalytic reduction (SCR) catalyst. The catalyst composition in particular can comprise a support formed of at least one metal oxide, the support including at least a first dopant. In preferred embodiments, the support is formed of at least ceria, and the dopant is at least niobia ($Nb_2O_5$).

The niobia is preferably present in the catalyst composition in an amount of about 0.1% to about 20% by weight, about 0.1% to about 15% by weight, about 0.1 to about 10% by weight, or about 0.1 to about 8% by weight. In some embodiments, the niobia can be present in an amount of about 1% to about 10% by weight, about 1.5% to about 8% by weight, or about 2% to about 6% by weight. The foregoing amounts are based on the total weight of the catalyst composition.

In addition to niobia, the catalyst composition can include a second dopant. In preferred embodiments, the second dopant can particularly be a base metal oxide (BMO). Non-limiting examples of BMOs that can be utilized as a second dopant include lanthanum oxide ($La_2O_3$), praseodymium oxide ($Pr_6O_{11}$), neodymium oxide ($Nd_2O_3$), yttrium oxide ($Y_2O_3$), titanium dioxide ($TiO_2$), tungsten oxide ($W_2O_5$), iron oxide ($Fe_2O_3$), copper oxide (CuO), manganese oxide ($MnO_2$), nickel oxide (NiO), magnesium oxide (MgO), and barium oxide (BaO). Any combination of two or more BMOs also may be utilized as the second dopant. As such, the catalyst composition may be characterized as include one dopant, two dopants, three dopants, four dopants, and so on. In one or more embodiments, a specific BMO (including but not limited to the foregoing listing) may be excluded. In certain embodiments, preferred BMOs may include $La_2O_3$, $Pr_6O_{11}$, $Nd_2O_3$, $Y_2O_3$, $TiO_2$, $W_2O_5$, $Fe_2O_3$, NiO, and combinations thereof. In further embodiments, preferred BMOs may include $La_2O_3$, $Pr_6O_{11}$, $Nd_2O_3$, $Y_2O_3$, $W_2O_5$, and combinations thereof.

The dopant(s) included in addition to niobia can separately be present in an amount of about 0.1% to about 20% by weight, about 0.1% to about 10% by weight, or about 0.1 to about 8% by weight. In some embodiments, the dopant(s) included in addition to niobia can be separately present in an amount of about 1% to about 10% by weight, about 1.5% to about 8% by weight, or about 2% to about 6% by weight. The foregoing amounts are based on the total weight of the catalyst composition.

The total amount of dopants (i.e., niobia plus one or more additional dopants) included with the catalyst composition can be about 1% to about 40%, about 1% to about 30%, about 1.5% to about 20%, or about 2% to about 10% by weight. The foregoing amounts are based on the total weight of the catalyst composition.

The support component of the catalyst composition can comprise completely or substantially completely ceria. For example, the support may comprise at least 99% by weight ceria and thus comprise substantially only ceria. Comprising "completely ceria" can indicate that the support component comprises at least 99.9% by weight ceria. Comprising "substantially only ceria" or substantially completely ceria" can indicate that the support component comprises at least 99% by weight ceria.

In some embodiments, the support can comprise ceria and at least one additional metal oxide. For example, the support can comprise about 10% to about 95% by weight ceria and about 5% to about 90% by weight of at least one further metal oxide. In some embodiments, the support can comprise about 20% to about 80% by weight ceria and about 80% to about 20% by weight of at least one further metal oxide. In further embodiments, the support can comprise about 50% to about 95% by weight ceria and about 5% to about 50% by weight of at least one further metal oxide. The foregoing amounts are based on the total weight of the support component of the catalyst composition.

Non-limiting examples of metal oxides that may be included in the support in addition to ceria include aluminum oxide ($Al_2O_3$), lanthanum oxide ($La_2O_3$), neodymium oxide ($Nd_2O_3$), and yttrium oxide ($Y_2O_3$). In a preferred example, the support component of the catalyst composition comprises ceria and aluminum oxide.

The catalyst composition can be prepared by any suitable method for combining a metal oxide dopant with a metal oxide support. In particular, the support component formed of ceria (alone or in combination with at least one additional metal oxide) can be impregnated with niobia (alone or in combination with at least one additional dopant) that is in the form of a metal solution. For example, any of the following metal compounds may be provided in solution for impregnation of the corresponding metal oxide: ammonium niobium(V) oxalate (ANO); $La(NO_3)_3$; $Pr(NO_3)_3$; $Nd(NO_3)_3$; $Y(NO_3)_3$; $Ti(OC_2H_5)_4$; $(NH_4)_6H_2W_{12}O_{40} \cdot H_2O$; $Fe(NO_3)_3 \cdot H2O$; $Cu(NO_3)_2 \cdot 2.5H_2O$; $Mn(NO_3)_2 \cdot 6H_2O$; $Ni(NO_3)_2 \cdot 6H_2O$; $Mg(NO_3)_2$; and $Ba(OAc)_2$. The metal oxides may be impregnated into the support component using an incipient wetness technique. Incipient wetness impregnation techniques, also called capillary impregnation or dry impregnation are commonly used for the synthesis of heterogeneous materials, i.e., catalysts. Typically, an active metal precursor is dissolved in an aqueous or organic solution and then the active metal-containing solution is added to a catalyst support containing the same pore volume as the volume of the solution that was added. The metal may be provided in the form of any soluble salt thereof, such as a metal acetate, nitrate, halide, oxalate, or the like. Capillary action draws the solution into the pores of the support. Solution added in excess of the support pore volume causes the solution transport to change from a capillary action process to a diffusion process, which is much slower.

In some embodiments, the support component and the dopant(s) are in the form of a co-precipitant. For example, metal precursor compounds for the support component (e.g., ceria) and the at least one dopant (e.g., niobia) can be combined in solution, and a precipitating agent can be added. For example, a pH-adjusting agent may be used as the precipitating agent. The precipitating agent can be effective to co-precipitate the metal species from the solution. As such, the niobia alone or in combination with at least one further dopant is intermixed with the ceria (or ceria combined with another base metal oxide) and simultaneously formed into a unitary body. It is thus understood that a co-precipitant, because of the intermixture of materials arising during co-precipitation, can exhibit different properties from a material wherein the dopant(s) are impregnated into a previously formed support component.

Following impregnation of the support component with the solution of the (active) metal precursors, the catalyst composition is dried, such as by heat treating at elevated temperature (e.g., 100-150° C.) for a period of time (e.g., 1-3 hours), and then calcined to remove the volatile components within the solution, depositing the metal on the surface of the molecular sieves and converting the metal to a more catalytically active oxide form. The concentration profile of the impregnated material depends on the mass transfer conditions within the pores during impregnation and drying.

The temperature during calcination of the catalyst composition is less than about 800° C. In some embodiments, the calcining temperature ranges from about 300° C. to about 700° C., about 300° C. to about 500° C., about 350° C. to about 500° C., about 400° C. to about 500° C., or from about 425° C. to about 475° C. for a period of time. In some embodiments, the calcining temperature is less than about 700° C., about 600° C., about 500° C., about 450° C., about 400° C., or about 350° C., with a lower boundary of 300° C. In some embodiments, the period of time for calcination ranges from about 1 hour to about 16 hours, about 1 to about 10 hours, or from 3 hours to about 6 hours (i.e., less than about 16 hours, about 15 hours, about 14 hours, about 13 hours, about 12 hours, about 11 hours, about 10 hours, about 9 hours, about 8 hours, about 7 hours, about 6 hours, about 5 hours, about 4 hours, about 3 hours, about 2 hours, or about 1 hour with a lower boundary of about 10 minutes).

In order to reach the desired level of dopant being ion-exchanged or impregnated, the above process can be repeated more than once. The resulting material can be stored as a dry powder or in slurry form.

The catalyst composition can be utilized in a catalyst article in which the catalyst composition can be provided on a catalyst substrate. According to one or more embodiments, the substrate for the SCR catalyst composition may be constructed of any material typically used for preparing automotive catalysts and will typically comprise a metal or ceramic honeycomb structure. The substrate typically provides a plurality of wall surfaces upon which a washcoat of the SCR catalyst composition is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like.

The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon carbide, silicon nitride, aluminum titanate, zircon mullite, spodumene, alumina-silica magnesia, zircon silicate, sillimanite, magnesium silicates, zircon, petalite, a alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

Figure 1:
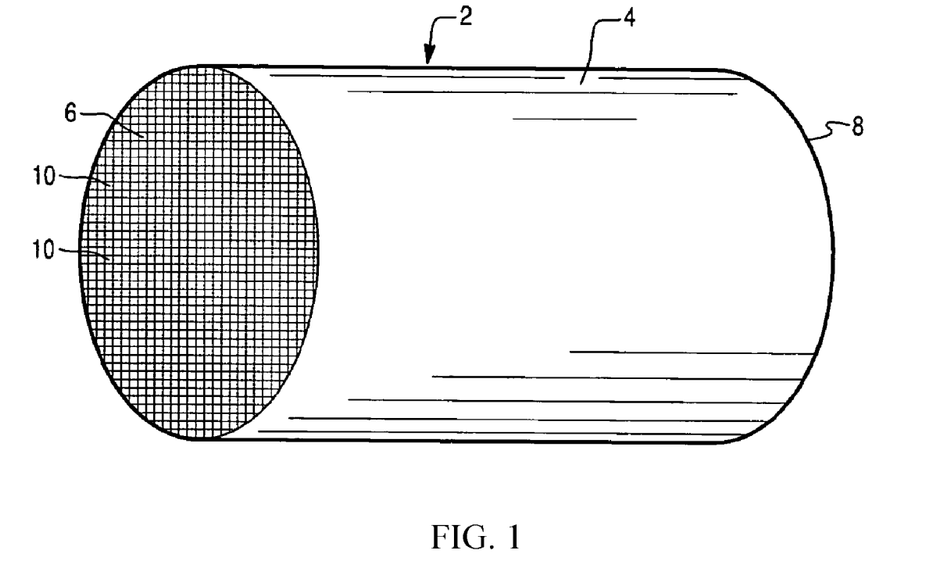
FIG. 1 is a perspective view of a honeycomb-type substrate carrier which may comprise a selective reduction catalyst (SCR) washcoat composition in accordance with the present invention.
Figure 2:
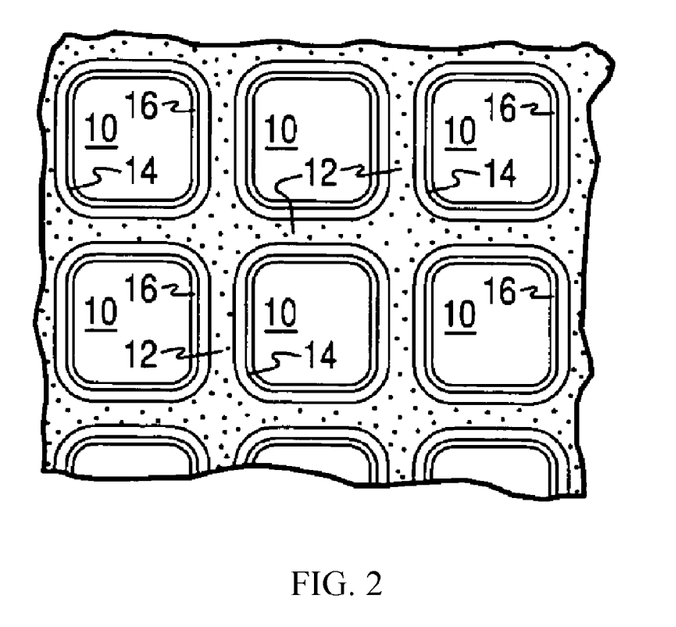
FIG. 2 is a partial cross-sectional view enlarged relative to FIG. 1 and taken along a plane parallel to the end faces of the substrate carrier of FIG. 1 representing a monolithic flow-through substrate, which shows an enlarged view of a plurality of the gas flow passages shown in FIG. 1.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the SCR catalyst composition can permeate into the pore structure of the porous walls (i.e., partially or fully occluding the pore openings) in addition to being disposed on the surface of the walls. FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

Figure 3:
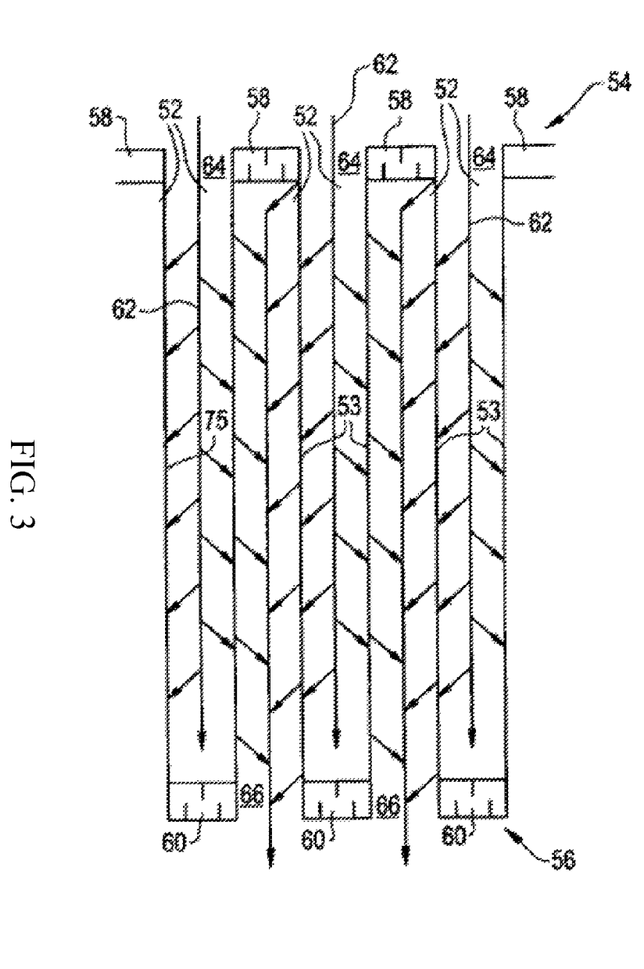
FIG. 3 is a cutaway view of a section enlarged relative to FIG. 1, wherein the honeycomb-type substrate carrier in FIG. 1 represents a wall flow filter substrate monolith.

FIG. 3 illustrates an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may be filled with all, or part, of the catalytic material. This invention includes the use of one or more layers of catalytic material that are within the wall or on the inlet and/or outlet walls of the element.

For example, in one embodiment, a catalytic article comprises a catalytic material with multiple layers, wherein each layer has a different catalyst composition. The bottom layer (e.g., layer 14 of FIG. 2) can comprise an SCR catalyst composition as described herein, and the top layer (e.g., layer 16 of FIG. 2) can comprise a further catalyst composition. Alternatively, the top layer 16 can comprise an SCR catalyst composition, and the bottom layer 14 can comprise a further catalyst composition. It is understood in FIG. 2 that the bottom layer 14 and the top layer 16 each can extend fully from a front or inlet end of the substrate to a rear or outlet end of the substrate.

In some embodiments, the further catalyst composition may comprise a platinum group metal (PGM). In particular, palladium and/or rhodium may be used; however, other PGMs may also (or alternatively) be used. Further, if desired, a specific PGM may be expressly excluded from the present disclosure. When present, a PGM may be present in a loading of at least about 0.5 g/ft$^3$, for example with a maximum loading of about 20 g/ft$^3$. Accordingly, when present, a PGM may be present in an amount of up to about 20 g/ft$^3$. In certain embodiments, the total PGM loading can be about 0.5 g/ft$^3$ to about 20 g/ft$^3$, about 1 g/ft$^3$ to about 10 g/ft$^3$, or about 2 g/ft$^3$ to about 10 g/ft$^3$. In certain embodiments, it can be desirable for a catalyst composition and/or catalyst article of the present disclosure to be substantially free of a PGM. To this end, a catalyst composition may be "substantially free" of a PGM if it includes less than 0.1% by weight PGM or less than 0.01% by weight PGM. Likewise, a catalyst article may be "substantially free" of PGM if it has a PGM loading of less than 0.1 g/ft$^3$ or less than 0.01 g/ft$^3$. Preferably, "substantially free" can mean only a trace amount is present. In some embodiments, a catalyst composition or catalyst article can be completely free of PGM if desired.

In additional embodiments, a further catalyst composition utilized in a multi-layer catalytic coating can be an ammonia oxidation catalyst (AMOx). AMOx catalysts are taught for instance in U.S. Pub. No. 2011/0271664, the disclosure of which is incorporated herein by reference. An ammonia oxidation (AMOx) catalyst may be a supported precious metal component which is effective to remove ammonia from an exhaust gas stream. The precious metal may include ruthenium, rhodium, iridium, palladium, platinum, silver, or gold. For example, the precious metal component includes physical mixtures or chemical or atomically-doped combinations of precious metals. The precious metal component for instance includes platinum. Platinum may be present in an amount of from about 0.008% to about 2 wt % based on the AMOx catalyst.

Figure 4:
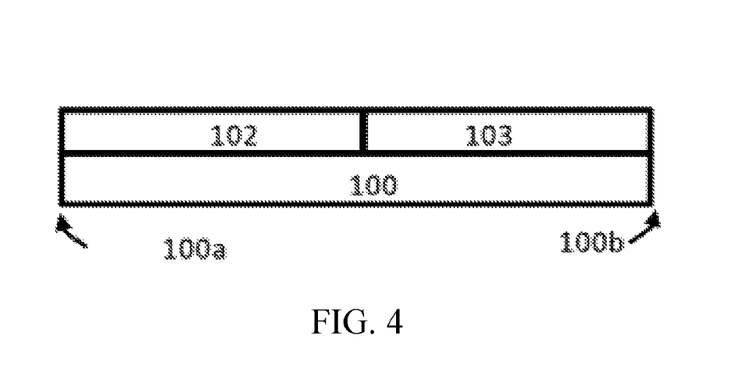
FIG. 4 is a partial cross-sectional view of a substrate with a plurality of layers of different catalytic articles washcoated thereon in a non-overlapping configuration.

In some embodiments, the substrate can be coated with at least two layers contained in separate washcoat slurries in an axially zoned configuration. For example, the same substrate can be coated with a washcoat slurry of one layer and a washcoat slurry of another layer, wherein each layer is different. The two separate washcoat compositions may include separate catalyst compositions and may be substantially non-overlapping. For example, referring to FIG. 4, a first washcoat zone 102 including a washcoat of a first catalyst composition and a second washcoat zone 103 including a washcoat of a second, different catalyst composition can be located side by side along the length of the substrate 100. The first washcoat zone 102 of specific embodiments extends from the front or inlet end 100a of the substrate 100 through the range of about 5% to about 95%, from about 5% to about 75%, from about 5% to about 50%, or from about 10% to about 35% of the length of the substrate 100. The second washcoat zone 103 extends from the rear or outlet end 100b of the substrate 100 from about 5% to about 95%, from about 5% to about 75%, from about 5% to about 50%, or from about 10% to about 35% of the total axial length of the substrate 100. The catalyst compositions of at least two components within a treatment system as described in the current invention can be zoned onto the same substrate. The first washcoat zone 102 may be an SCR catalyst composition as described herein and thus can be coated proximate to the front or inlet end 100a of the substrate 100. Hence, the second washcoat zone 103 may be formed of a different catalyst composition that is thus coated proximate to the rear or outlet 100b of the substrate 100. In another embodiment, the second washcoat zone 103 can represent the SCR catalyst composition of the present disclosure, and the first washcoat zone 102 can comprise the further, different catalyst composition.

Figure 5:
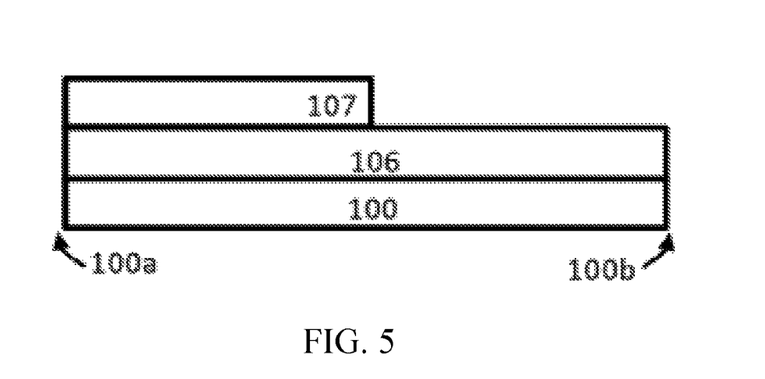
FIG. 5 is a partial cross-sectional view of a substrate with a plurality of layers of different catalytic articles washcoated thereon, wherein one washcoat layer is partially overlapping a second washcoat layer.

In some embodiments, as seen in FIG. 5, a substrate 100 can be coated with a first coating layer 106 extending from the front or inlet end 100a of the substrate 100 to the rear or outlet end 100b of the substrate 100 and a second coating layer 107 that is coated over the first coating layer 106 proximate the front or inlet end 100a of the substrate 100 and extending across only a partial length of the substrate 100 (i.e., terminating before reaching the rear or outlet end 100b of the substrate 100). In some embodiments, the first coating layer 106 can comprise the SCR catalyst composition and the second coating layer 107 can comprise a further catalyst composition. In another embodiment, the second coating layer can comprise the SCR catalyst composition and the second coating layer can comprise the further catalyst composition.

Figure 6:
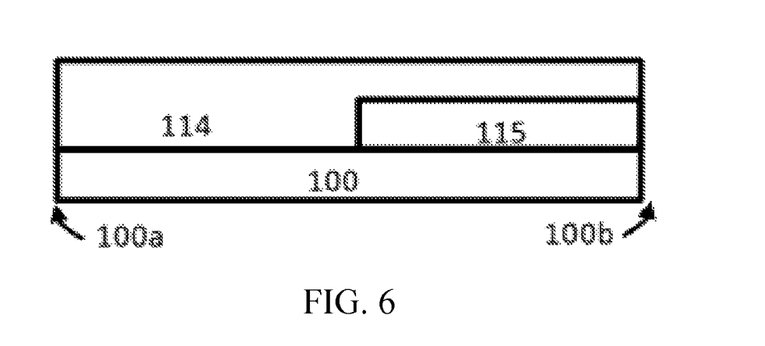
FIG. 6 is a partial cross-sectional view of a substrate with a plurality of layers of different catalytic articles washcoated thereon, wherein one washcoat layer is completely overlapping a second washcoat layer.

In some embodiments, as seen in FIG. 6, a substrate 100 can be coated with a first coating layer 115 proximate the rear or outlet end 100b of the substrate 100 and extending only partially along the length of the substrate 100 (i.e., terminating before reaching the front or inlet end 100a of the substrate 100). The substrate 100 can be coated with a second coating layer 114. As seen in FIG. 6, the second coating layer 114 extends from the front or inlet end 100a of the substrate 100 to the rear or outlet end 100b of the substrate 100 (and thus is coated completely over the first coating layer 115). In some embodiments, the first coating layer 115 can comprise the SCR catalyst composition and the second coating layer 114 can comprise the further catalyst composition. In another embodiment, the second coating layer 114 can comprise the SCR catalyst composition and the first coating layer 115 can comprise the SCR catalyst composition. It is understood that the embodiments above provided as examples, and further combinations of catalytic coatings are encompassed.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$") are used herein to mean the weight of a component per volume of the substrate, including the volume of void spaces of the substrate. Other units of weight per volume such as g/L are also sometimes used. The total loading of the SCR catalyst composition on the catalyst substrate, such as a monolithic flow-through substrate, is typically from about 0.1 to about 6 g/in$^3$, and more typically from about 1 to about 5 g/in$^3$. In some embodiments, the SCR catalyst composition can be present in a loading amount of up to about 20 g/ft$^3$. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

The above-noted SCR catalyst composition (typically in a powder or particulate form) is mixed with water to form a slurry for purposes of coating a catalyst substrate, such as a honeycomb-type substrate. In addition to the catalyst particles, the slurry may optionally contain binders (such as alumina, silica, and/or titania), zirconium acetate, water-soluble or water-dispersible stabilizers (e.g., barium acetate), promoters (e.g., lanthanum nitrate), associative thickeners, and/or surfactants (including anionic, cationic, non-ionic or amphoteric surfactants), and/or other similar materials known to be useful in washcoats.

When present, the binder is typically used in an amount of about 0.05 g/in$^3$ to about 1 g/in$^3$. When alumina is used as the binder it can be, for example, boehmite, pseudo-boehmite, gamma-alumina, delta/theta alumina, silica-alumina, zirconia-alumina, or combinations thereof.

The slurry can be milled to enhance mixing of the particles and formation of a homogenous material. The milling can be accomplished in a ball mill, continuous mill, or other similar equipment, and the solids content of the slurry may be, e.g., about 10-80 wt. %, more particularly about 30-40 wt. %. In one embodiment, the post-milling slurry is characterized by a D90 particle size of about 5 to about 40 microns, preferably 5 to about 30 microns, more preferably about 5 to about 10 microns. The D90 is defined as the particle size at which 90% of the particles have a finer particle size.

The slurry is then coated on the catalyst substrate using a washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., about 10 minutes to about 3 hours) and then calcined by heating, e.g., less than 700° C., typically for about 10 minutes to about 8 hours.

The temperature during calcination of coated catalyst substrate is less than about 700° C. In some embodiments, the calcining temperature ranges from about 300° C. to about 700° C., about 300° C. to about 500° C., about 350° C. to about 500° C., about 400° C. to about 500° C., or from about 450° C. to about 500° C. for a period of time. In some embodiments, the calcining temperature is less than about 700° C., about 600° C., about 500° C., about 450° C., about 400° C., or about 350° C. with a lower boundary of 300° C. In some embodiments, the period of time for calcination ranges from about 10 minutes to about 8 hours, about 1 to about 6 hours, or from 3 hours to about 6 hours (i.e., less than 8 hours, 7 hours, 6 hours, 5 hours, 4 hours, 3 hours, 2 hours, or 1 hour with a lower boundary of about 10 minutes).

Following drying and calcining, the final washcoat coating layer can be viewed as essentially solvent-free. After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat layer may be applied. For example, in some embodiments, the catalyst composition can be applied as a single layer or in multiple layers. In one embodiment, the catalyst is applied in a single layer (e.g., only layer 14 of FIG. 2). In another embodiment, the catalyst composition is applied in multiple layers (e.g., layers 14 and 16 of FIG. 2). The catalyst composition described herein (e.g., a support comprising ceria (and optionally additional support materials) that is doped with niobia and optionally one or more further dopants) can be provided as a bottom coating layer or a top coating layer in combination with a coating layer formed of a different catalyst composition.

In some embodiments, the calcined coated substrate is aged. Aging can be conducted under various conditions and, as used herein, "aging" is understood to encompass a range of conditions (e.g., temperature, time, and atmosphere). Exemplary aging protocols involve subjecting the calcined coated substrate to a temperature of 650° C. for about 50 hours in 10% steam, 750° C. for about 5 hours in 10% steam, or to a temperature of 800° C. for about 16 hours in 10% steam. However, these protocols are not intended to be limiting and the temperature can be lower or higher (e.g., including but not limited to, temperatures of 400° C. and higher, e.g., 400° C. to 900° C., 600° C. to 900° C., or 650° C. to 900° C.); the time may be lesser or greater (e.g., including but not limited to, times of about 1 hour to about 50 hours or about 2 hours to about 25 hours); and the atmosphere can be modified (e.g., to have different amounts of steam and/or other constituents present therein).

The present disclosure also provides an emission treatment system that incorporates the SCR catalyst composition described herein. The SCR catalyst composition of the present invention is typically used in an integrated emissions treatment system comprising one or more additional components for the treatment of exhaust gas emissions, e.g., exhaust gas emissions from a gasoline engine. For example, the emission treatment system may comprise a TWC in a close couple configuration with a catalyst article comprising an SCR catalyst composition as described herein.

Figure 7:
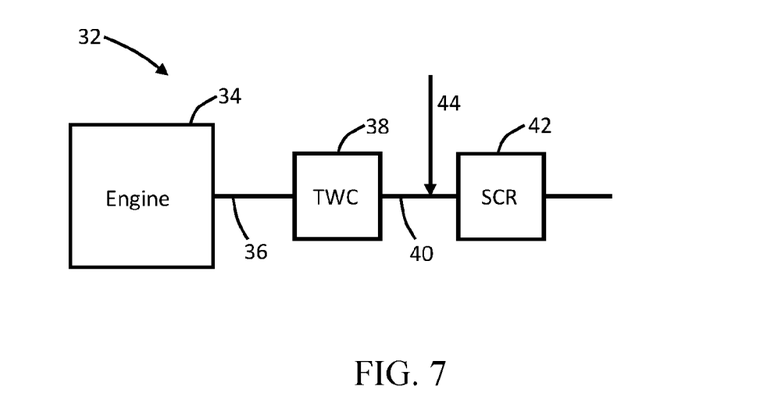
FIG. 7 is a schematic of an emission treatment system in which an SCR catalyst composition of the present invention is utilized.

One exemplary emissions treatment system is illustrated in FIG. 7, which depicts a schematic representation of an emission treatment system 32. As shown, an exhaust gas stream containing gaseous pollutants and is conveyed via exhaust pipe 36 from an engine 34 to a TWC 38 then in pipe 40 to a selective catalytic reduction (SCR) component 42, which is coated with the washcoat catalyst composition of the present disclosure. While there can be sufficient nitrogenous reducing agent in the exhaust exiting the TWC, in some embodiments, an injector 44 for introducing a nitrogenous reducing agent into the exhaust stream may be located upstream of the SCR catalyst component 42, if desired. The introduced nitrogenous reducing agent into the gas exhaust stream promotes the reduction of the $NO_x$ to $N_2$ and water as the gas is exposed to the catalyst composition. Examples of reductants include ammonia, hydrazine or any suitable ammonia precursor such as urea (($NH_2$)$_2$CO), ammonium carbonate, ammonium carbamate, ammonium hydrogen carbonate or ammonium formate. In one embodiment, the nitrogenous reducing agent may be added using a reductant injector, which adds ammonia precursor to the gas exhaust stream upstream of the SCR component 46.

The present disclosure can be particularly beneficial in that it is possible to reduce ammonia emissions from an engine exhaust. Whereas ammonia (or other nitrogenous reducing agent) is typically added to an SCR treatment system, the present disclosure benefits from the ability to provide for SCR treatment of a gasoline engine or lean GDI engine without the need to added nitrogenous reducing agent. Thus, any residual ammonia in the exhaust may be substantially reacted during the SCR catalytic reaction, and the total amount of ammonia (or other nitrogenous reducing agent) that would otherwise be exhausted from the system can be reduced or eliminated.

EXAMPLES

Aspects of the present invention are more fully illustrated by the following examples, which are set forth to illustrate certain aspects of the present invention and are not to be construed as limiting thereof.

Example 1

Ammonium niobium(V) oxalate (ANO, 23.2% $Nb_2O_5$) was dissolved in deionized water. The ANO aqueous solution was impregnated onto a powder support by the incipient wetness technique to achieve the desired $Nb_2O_5$ loading (2%, 5%, 10%, or 20% by weight). The powder support was formed of: ceria alone; aluminum oxide alone, mixed zirconium oxide and lanthanum oxide; mixed zirconium oxide, cerium oxide, yttrium oxide, and lanthanum oxide; or mixed cerium oxide and aluminum oxide. The impregnated wet powder was dried at 120° C. and calcined at 550° C. for 2 hours in air. The sample compositions (1A through 1J) are summarized in Table 1.

TABLE 1

| Example | Dopant, wt % | Support Composition |
|---|---|---|
| 1A | $Nb_2O_5$, 5% | $CeO_2$ |
| 1B | $Nb_2O_5$, 5% | $\gamma$-$Al_2O_3$ |
| 1C | $Nb_2O_5$, 5% | 90% $ZrO_2$-10% $La_2O_3$ |

TABLE 1-continued

| Example | Dopant, wt % | Support Composition |
|---|---|---|
| 1D | $Nb_2O_5$, 5% | 50% $ZrO_2$-40% $CeO_2$-5% $Y_2O_3$-5% $La_2O_3$ |
| 1E | $Nb_2O_5$, 5% | 70% $CeO_2$-30% $Al_2O_3$ |
| 1F | $Nb_2O_5$, 5% | 50% $CeO_2$-50% $Al_2O_3$ |
| 1G | $Nb_2O_5$, 5% | 30% $CeO_2$-70% $Al_2O_3$ |
| 1H | $Nb_2O_5$, 2% | $CeO_2$ |
| 1I | $Nb_2O_5$, 10% | $CeO_2$ |
| 1J | $Nb_2O_5$, 20% | $CeO_2$ |

Example 2

Example compositions 2A-2L were prepared by doping a second base metal oxide (in an amount of 5 wt %) onto the composition of Example 1A by the incipient wetness impregnation technique. The precursors used for forming the further base metal oxide dopants were as follows: $La_2O_3$: La($NO_3$)$_3$ aq.; $Pr_6O_{11}$: Pr($NO_3$)$_3$ aq.; $Nd_2O_3$: Nd($NO_3$)$_3$ aq.; $Y_2O_3$: Y($NO_3$)$_3$ aq.; $TiO_2$: Ti($OC_2H_5$)$_4$; $W_2O_5$: ($NH_4$)$_6H_2W_{12}O_{40}$·$xH_2O$; $Fe_2O_3$: Fe($NO_3$)$_3$·$xH_2O$; CuO: Cu($NO_3$)$_2$·2.5$H_2O$, $MnO_2$: Mn($NO_3$)$_2$·6$H_2O$; NiO: Ni($NO_3$)$_2$·6$H_2O$; MgO: Mg($NO_3$)$_2$; BaO: Ba(OAc)$_2$. These precursors were dissolved in de-ionized water for wetness impregnation, except for 2E wherein ethanol was used as solvent for the precursor Ti($OC_2H_5$)$_4$. The impregnated wet powder was dried at 120° C. and calcined at 550° C. for 2 hours in air. The sample compositions are summarized in Table 2.

TABLE 2

| Example | $1^{st}$ Dopant, wt % | $2^{nd}$ Dopant, wt % | Support Composition |
|---|---|---|---|
| 2A | $Nb_2O_5$, 5% | $La_2O_3$, 5% | $CeO_2$ |
| 2B | $Nb_2O_5$, 5% | $Pr_6O_{11}$, 5% | $CeO_2$ |
| 2C | $Nb_2O_5$, 5% | $Nd_2O_3$, 5% | $CeO_2$ |
| 2D | $Nb_2O_5$, 5% | $Y_2O_3$, 5% | $CeO_2$ |
| 2E | $Nb_2O_5$, 5% | $TiO_2$, 5% | $CeO_2$ |
| 2F | $Nb_2O_5$, 5% | $W_2O_5$, 5% | $CeO_2$ |
| 2G | $Nb_2O_5$, 5% | $Fe_2O_3$, 5% | $CeO_2$ |
| 2H | $Nb_2O_5$, 5% | CuO, 5% | $CeO_2$ |
| 2I | $Nb_2O_5$, 5% | $MnO_2$, 5% | $CeO_2$ |
| 2J | $Nb_2O_5$, 5% | NiO, 5% | $CeO_2$ |
| 2K | $Nb_2O_5$, 5% | MgO, 5% | $CeO_2$ |
| 2L | $Nb_2O_5$, 5% | BaO, % | $CeO_2$ |

Example 3

The $Nb_2O_5$ doped powders prepared in Example 1 and Example 2 were individually dispersed in deionized water to give a solid percentage of approximately 30%. The slurry was milled and then dried while stirring. The dried slurry was calcined at 700° C. for 2 hours. The resulting powder was crushed and sieved to collect particles of 250-500 μm size for testing on a high throughput reactor.

Aging was carried out at 850° C. for 5 hours under cyclic lean/rich conditions in the presence of 10% steam. The lean/rich aging cycle included 5 minutes of air, 5 minutes of $N_2$, 5 minutes of 4% $H_2$ balanced with $N_2$, and 5 minutes of $N_2$. Such a cycle was repeated till the desired aging duration was reached.

The catalytic performance was evaluated on a high throughput reactor at $\lambda$=1.00+/−0.05 with an oscillating feed of one second lean gas and one second rich gas. Lean gas at $\lambda$=1.05: 0.7% CO, 0.22% $H_2$, 1.8% $O_2$, 1500 ppm$C_1$ $C_3H_6$, 750 ppm$C_1$ $C_3H_8$, 750 ppm$C_1$ iso-$C_{10}H_{22}$, 750 ppm NO, 750 ppm $NH_3$, 14% $CO_2$, 10% $H_2O$, and balance $N_2$. Rich gas at λ=0.95: 2.0% CO, 0.7% $H_2$, 0.71% $O_2$, 1500 ppmC$_1$ $C_3H_6$, 750 ppmC$_1$ $C_3H_8$, 750 ppmC$_1$ iso-$C_{10}H_{22}$, 750 ppm NO, 750 ppm $NH_3$, 14% $CO_2$, 10% $H_2O$, and balance $N_2$. The sample amount is 100 mg for each liner at a flow rate of 70 L/h. The activities were measured at constant temperatures from 250-550° C. at a 25° C. intervals. The results are shown in Table 3.

TABLE 3

| Example | Conversion % at 350° C. | | | Conversion % at 450° C. | | | Conversion % at 550° C. | | |
|---|---|---|---|---|---|---|---|---|---|
|  | NOx | HC | CO | NOx | HC | CO | NOx | HC | CO |
| 1A | 42.3 | 0.0 | 3.2 | 54.4 | 12.4 | 19.1 | 30.5 | 45.4 | 39.6 |
| 1B | 0.6 | 0.0 | 5.0 | 3.1 | 13.4 | 20.9 | -19.7 | 51.1 | 49.3 |
| 1C | 1.5 | 0.0 | 4.4 | 4.3 | 15.8 | 22.2 | -21.0 | 51.6 | 49.8 |
| 1D | 3.4 | 0.7 | 3.2 | 7.3 | 7.6 | 18.5 | -11.5 | 46.2 | 49.0 |
| 1E | 31.1 | 0.0 | 9.3 | 48.0 | 21.7 | 32.0 | 25.3 | 44.6 | 52.4 |
| 1F | 43.2 | 0.7 | 13.2 | 63.0 | 24.2 | 37.8 | 32.8 | 54.2 | 62.8 |
| 1G | 40.8 | 4.2 | 20.5 | 65.6 | 30.1 | 51.7 | 43.3 | 61.7 | 77.8 |
| 1H | 45.6 | 6.4 | 14.1 | 52.0 | 28.3 | 34.4 | 20.7 | 58.5 | 66.7 |
| 1I | 42.7 | 0.5 | 2.9 | 54.7 | 7.3 | 13.4 | 30.9 | 34.6 | 31.0 |
| 1J | 36.6 | 0.9 | 3.9 | 48.7 | 5.7 | 12.7 | 34.1 | 32.8 | 22.2 |
| 2A | 37.1 | 32.8 | 22.2 | 46.4 | 9.6 | 15.9 | 32.2 | 36.4 | 31.2 |
| 2B | 39.7 | 0.4 | 4.9 | 49.9 | 16.1 | 23.5 | 20.5 | 51.6 | 48.3 |
| 2C | 54.6 | 1.9 | 5.8 | 64.7 | 15.3 | 26.3 | 26.9 | 54.4 | 56.8 |
| 2D | 52.3 | 1.5 | 10.4 | 63.2 | 24.0 | 33.5 | 26.8 | 61.3 | 65.0 |
| 2E | 26.8 | 61.3 | 65.0 | 30.9 | 1.9 | 2.9 | 22.0 | 35.9 | 23.4 |
| 2F | 22.0 | 35.9 | 23.4 | 28.1 | 11.1 | 18.6 | 17.8 | 32.8 | 28.0 |
| 2G | 30.2 | 8.5 | 16.3 | 29.5 | 41.3 | 49.3 | 14.8 | 66.2 | 76.6 |
| 2H | 19.3 | 7.5 | 27.3 | -27.3 | 57.2 | 92.5 | -32.0 | 66.6 | 96.2 |
| 2I | 18.5 | 6.2 | 17.7 | 21.6 | 16.3 | 31.9 | 2.5 | 65.8 | 75.7 |
| 2J | 40.3 | 18.3 | 32.4 | 34.7 | 39.6 | 52.6 | 12.6 | 66.3 | 77.0 |
| 2K | 17.8 | 32.8 | 28.0 | 7.1 | 10.2 | 17.6 | -13.7 | 47.0 | 53.2 |
| 2L | 2.3 | 0.0 | 3.2 | 2.2 | 7.8 | 15.3 | -38.6 | 7.8 | 15.3 |

Under the powder testing conditions, 5% $Nb_2O_5/CeO_2$ (Example 1A) gave 30.5-54.4% NOx conversions at 350-550° C. In comparison, γ-alumina (Example 1B), lanthana-stabilized zirconia (Example 1C), and ceria-zirconia (Example 1D) as supports for 5% $Nb_2O_5$ exhibited poor NOx performance. Ceria-alumina mixed composites (Examples 1E-G), especially with a ceria content greater than or equal to 50%, afforded better NOx activities in comparison with 5% $Nb_2O_5/CeO_2$. For instance, Example 1G gave NOx conversions of 65.6% and 43.3% at 450° C. and 550° C., respectively. The performance improvement is presumably attributable to the stabilization effect of alumina on ceria, which can make the ceria component more resistant to high temperature aging. 2-20% $Nb_2O_5/CeO_2$ (Examples 1A, 1H-J) composites were all active in NOx abatement, with a preferred $Nb_2O_5$ loading of 5-10%. Second dopants of base metal oxides (Examples 2A-L) were screened with a loading of 5 wt %. In general, lanthanide oxides, e.g., $La_2O_3$, $Pr_6O_{11}$, $Nd_2O_3$ and $Y_2O_3$, are compatible with the 5% $Nb_2O_5/CeO_2$ composite. $Nd_2O_3$ and $Y_2O_3$ doped materials actually gave better NOx conversions at 350-450° C. Dopants of $Fe_2O_3$, CuO, $MnO_2$ and NiO (Example 2G-2J) gave lower NOx conversions because these transition metal oxides had non-selective oxidation activity of ammonia. Alkaline earth metal oxides such as MgO and BaO (Examples 2K and 2L) were detrimental to the SCR activity.

Example 4

A conventional TWC catalyst with a three-layer washcoat architecture was prepared according to Example 1 of U.S. Pat. No. 7,758,834, which is incorporated herein by reference. In particular, the first layer was formed of 10% baria stabilized gamma alumina, lanthanum oxide, strontium oxide, zirconium oxide, neodymium oxide, a composite of cerium and zirconium oxide with approximately 30% ceria content and palladium at the concentrations of 64%, 6.4%, 6.4%, 2.6%, 6.4%, 12.8% and 1.1%, respectively, based on the calcined weight of the catalyst. The palladium (70 g/ft$^3$) in the form of palladium nitrate solutions were impregnated by planetary mixer (P-mixer) onto the stabilized alumina to form a wet powder while achieving incipient wetness. The other components such as promoters and stabilizers were introduced as their soluble salts using water as the slurrying vehicle. The aqueous slurry was formed by combining all above components and milled to a particle size of 90% less than 9 microns and coated onto the cordierite carrier. After coating, the carrier plus the first layer was calcined at a temperature of 550° C. for at least 2 hours. The second layer was formed of 26.1% by weight stabilized gamma alumina, 0.7% by weight of a mixture of zirconium oxide and alumina oxide as binders, 69.3% by weight of a composite of cerium and zirconium oxide with approximately 30% ceria content, and 0.9% by weight rhodium, based on the calcined weight of the catalyst. The catalyst was prepared by impregnating rhodium (14 g/ft$^3$) in the form of rhodium nitrate by P-mixer onto stabilized alumina and composite cerium and zirconium separately with a distribution of 30/70 ratio. The rhodium-alumina and rhodium-ceria-zirconia powders were each added into a basic solution containing monoethanolamine (MEA) around three times of rhodium weight and mixed for 10 minutes. Zirconium hydroxide 0.7% wt % as of total solid was added into slurry containing rhodium-alumina. Each slurry then was acidified to bring pH range about 4 to 5 for milling. The aqueous slurry was individually milled to a particle size of 90% less than 9 microns prior to combination. The resultant slurry having a solids content of about 28% can be either milled briefly again or homogenized to ensure particle size to be 90% less than 9 microns. It was thereafter coated onto the first layer. The resultant carrier plus first layer and second layer was calcined at 450° C. for no less than 2 hours. After cooling, the third layer was coated onto the second layer. The third layer was formed of gamma alumina doped with 10% baria-10% lanthana-7% neodymia, strontia, mixed oxide of cerium and zirconium, zirconia, and palladium at the concentrations of 65.6%, 6.7%, 24.6, 0.8% and 2.4%, based on the finished calcined weight of the third layer. The aqueous slurry containing palladium (116 g/ft$^3$) was produced in the same manner as the slurry for first layer. The aqueous slurry was milled to a particle size of less than 9 microns and coated onto the second layer. After coating, the carrier plus the first layer and the second layer was calcined at a temperature of 550° C. for 2 hours.

The catalyst prepared as described above was coated onto a 4.66"×2.87" cylinder cordierite monolith substrate having a cell density of 600 cpsi and a wall thickness of 3.5 mil (about 100 μm). The total PGM loading was 200 g/ft$^3$ with a Pd/Rh ratio of 186/14.

Example 5

A catalyst article was prepared utilizing an SCR catalyst composition comprising 5% $Nb_2O_5/CeO_2$. The washcoat was formed of 73.5% by weight of the Example 1A composition (5% $Nb_2O_5/CeO_2$), 24.5% by weight of a 4% $La_2O_3$-stabilized γ-$Al_2O_3$, and 2% by weight of a boehmite binder, based on the calcined weight of the catalyst article. The slurry was milled to reduce the average particle size and then coated onto 4.66"×2.87" cylinder cordierite monolith substrates, having a cell density of 600 cpsi and a wall thickness of 3.5 mil, to reach the target washcoat loading of 2.45 g/in$^3$. The coated catalysts were flash dried on a flow-through drier at 200° C. and calcined at 550° C. for 2 hours.

Example 6

A catalyst article was prepared utilizing an SCR catalyst composition comprising 5% $Nb_2O_5$/70% $CeO_2$-30% $Al_2O_3$. The washcoat was formed of 98% by weight of the Example 1E composition (5% $Nb_2O_5$/70% $CeO_2$-30% $Al_2O_3$) and 2% by weight of a boehmite binder, based on the calcined weight of the catalyst. The slurry was milled to reduce the average particle size and then coated onto 4.66"×2.87" cylinder cordierite monolith substrates, having a cell density of 600 cpsi and a wall thickness of 3.5 mil, to reach the target washcoat loading of 2.45 g/in$^3$. The coated catalysts were flash dried on a flow-through drier at 200° C. and calcined at 550° C. for 2 hours.

Example 7

A catalyst article was prepared utilizing a PGM-free catalyst comprising a two-layer washcoat architecture. The bottom coat, with a washcoat loading of 1.25 g/in$^3$, contained $Fe_2O_3$ in form of $Fe(NO_3)_3 \cdot xH_2O$, and a composite of $CeO_2$ and $Al_2O_3$ (50% $CeO_2$-50% $Al_2O_3$) at concentrations of 5% and 95%, respectively, based on the calcined weight of the catalyst. The top coat, with a washcoat loading of 2.45 g/in$^3$, contained 73.5% by weight of the Example 1A catalyst composition (5% $Nb_2O_5/CeO_2$), 24.5% by weight of a 4% $La_2O_3$-stabilized γ-$Al_2O_3$, and 2% by weight of a boehmite binder, based on the calcined weight of the catalyst. The slurries were milled to reduce the average particle size and then coated onto 4.66"×2.87" cylinder cordierite monolith substrates, having a cell density of 600 cpsi and a wall thickness of 3.5 mil, to reach the target washcoat loading. The coated catalysts were flash dried on a flow-through drier at 200° C. and calcined at 550° C. for 2 hours.

Example 8—Comparative

A catalyst article was prepared utilizing a Cu-CHA based downstream SCR catalyst for passive $NH_3$-SCR reactions. The washcoat was formed of 95% by weight of Cu-SSZ-13 (2.4% CuO) and 5% by weight of $ZrO_2$ as a $ZrO(OAc)_2$ aqueous solution, based on the calcined weight of the catalyst. The slurry was milled to reduce the average particle size and then coated onto 4.66"×2.87" cylinder cordierite monolith substrates, having a cell density of 600 cpsi and a wall thickness of 3.5 mil, to reach the target washcoat loading of 2.73 g/in$^3$. The coated catalysts were flash dried on a flow-through drier at 200° C. and calcined at 550° C. for 2 hours.

Example 9

A catalyst article was prepared utilizing an ultralow PGM catalyst comprising a two-layer washcoat architecture. The bottom coat, with a washcoat loading of 1.63 g/in$^3$, was formed of 73.5% by weight of the Example 1A catalyst composition (5% $Nb_2O_5/CeO_2$), 24.5% by weight of a 4% $La_2O_3$-stabilized γ-$Al_2O_3$, and 2% by weight of a boehmite binder, based on the calcined weight of the catalyst. The top coat, with a washcoat loading of 2.15 g/in$^3$, was formed of 0.054% by weight of Rh in form of a $Rh(NO_3)_3$ aqueous solution, 37.2% by weight of a 4% $La_2O_3$-stabilized γ-$Al_2O_3$, 30.2% by weight of a composite of $CeO_2$ and $ZrO_2$ (with a 40% $CeO_2$ content), 30.2% by weight of a 10% $La_2O_3$-stabilized $ZrO_2$, and 2.3% by weight of a boehmite binder, based on the calcined weight of the catalyst. The slurries were milled to reduce the average particle size and then coated onto 4.66"×2.87" cylinder cordierite monolith substrates, having a cell density of 600 cpsi and a wall thickness of 3.5 mil, to reach the target washcoat loading. The coated catalysts were flash dried on a flow-through drier at 200° C. and calcined at 550° C. for 2 hours.

Example 10—Comparative

A catalyst article was prepared by utilizing an ultralow PGM catalyst comprising a two-layer washcoat architecture. The bottom coat was exclusively γ-$Al_2O_3$ with a washcoat loading of 1.63 g/in$^3$. The top coat, with a washcoat loading of 2.15 g/in$^3$, contained 0.054% by weight of Rh in the form of a $Rh(NO_3)_3$ aqueous solution, 37.2% by weight of a 4% $La_2O_3$-stabilized γ-$Al_2O_3$, 30.2% by weight of a composite of $CeO_2$ and $ZrO_2$ (with a 40% $CeO_2$ content), 30.2% by weight of a 10% $La_2O_3$-stabilized $ZrO_2$, and 2.3% by weight of a boehmite binder, based on the calcined weight of the catalyst. The slurries were milled to reduce the average particle size and then coated onto 4.66"×2.87" cylinder cordierite monolith substrates, having a cell density of 600 cpsi and a wall thickness of 3.5 mil, to reach the target washcoat loading. The coated catalysts were flash dried on a flow-through drier at 200° C. and calcined at 550° C. for 2 hours.

Example 11

The monolith catalysts prepared in Examples 4 through 10 were individually mounted in steel converter cans and aged in an exhaust line of a gasoline engine under fuel-cut aging cycles to simulate a close coupled system with an upstream TWC catalyst (Example 4) and downstream SCR catalysts (Examples 5 through 10). The upstream TWC catalyst (Example 4) was aged at a maximum bed temperature of 950° C. for 50 hours. The downstream catalysts (Examples 5-10), were aged in at a maximum bed temperature of 920° C. for 50 hours. The aged catalysts were tested on a PZEV vehicle equipped with a 1.8 L gasoline engine, operating US FTP-75 driving cycles following certified procedures. All emission control systems contained Example 4 in a first close-coupled position (CC1) as the universal upstream TWC catalyst, and one of the remaining catalysts (Examples 5-10) in a second close-coupled position (CC2). The total amounts of nitrogen oxides, hydrocarbons, and carbon monoxide at tailpipe were measured by collecting three bags and the weighted averages were calculated. Table 4 provides $NO_R$, NMHC and CO tailpipe emissions of the catalyst systems on FTP-75 tests.

TABLE 4

| System | Upstream Catalyst | Downstream Catalyst | NOx mg/mile | NMHC mg/mile | CO mg/mile |
|---|---|---|---|---|---|
| System A | Example 4 | Example 5 | 65 | 35 | 405 |
| System B | Example 4 | Example 6 | 63 | 36 | 412 |
| System C | Example 4 | Example 7 | 63 | 32 | 356 |
| System D | Example 4 | Comp. Example 8 | 87 | 38 | 432 |
| System E | Example 4 | Example 9 | 15 | 23 | 194 |
| System F | Example 4 | Comp. Example 10 | 20 | 23 | 197 |

In comparison with System D containing the Cu-CHA based downstream SCR catalyst (Comparative Example 8), Systems A-C containing the $Nb_2O_3$ based SCR downstream catalysts (Examples 5-7) gave at least 22 mg/mile less NOx at tailpipe. The main reason is that Cu-CHA as a zeolite-based SCR component is not stable to TWC aging at a temperature high than 900° C. Improvements in NMHC and CO were also observed, especially for System C with Example 7, which comprised an additional layer of $Fe_2O_3$ based washcoat for oxidation activities. System E utilized Example 9 as the downstream catalyst, which contained a TWC top coat with a relatively low level of PGM in addition to a $Nb_2O_3$ based SCR bottom coat. System E gave 15 mg/mile NOx, 23 mg/mile NMHC, and 104 mg/mile CO at tailpipe. System F utilized Comparative Example 10 as the downstream catalyst, which contained the same TWC top coat with the same relatively low level of PGM and a $Nb_2O_3$-free alumina bottom layer. System F gave 20 mg/mile NOx at tailpipe, which is 33% more NOx emissions compared to System E. These findings indicate that the disclosed $Nb_2O_3$ based SCR composites can be formulated together with PGM based components for a better NOx conversion.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. An SCR catalyst composition, comprising a ceria support comprising a first dopant that is niobia and a second dopant that is a base metal oxide, wherein the composition is non-zeolitic.

2. The SCR catalyst composition of claim 1, wherein the base metal oxide is chosen from lanthanum oxide, praseodymium oxide, neodymium oxide, yttrium oxide, titanium dioxide, tungsten oxide, iron oxide, copper oxide, manganese oxide, nickel oxide, magnesium oxide, barium oxide, and combinations thereof.

3. The SCR catalyst composition of claim 2, wherein the base metal oxide is chosen from lanthanum oxide, praseodymium oxide, neodymium oxide, yttrium oxide, tungsten oxide, and combinations thereof.

4. The SCR catalyst composition of claim 1, wherein the niobia constitutes about 0.1 to about 20% by weight of the SCR catalyst composition.

5. The SCR catalyst composition of claim 1, wherein the second dopant constitutes about 0.1 to about 20% by weight of the SCR catalyst composition.

6. The SCR catalyst composition of claim 1, wherein the ceria support comprises at least 99% by weight ceria.

7. The SCR catalyst composition of claim 1, wherein the ceria support comprises about 10% to about 95% by weight ceria and about 5% to about 90% by weight of a further metal oxide, optionally wherein the further metal oxide is aluminum oxide.

8. A catalyst article, comprising a catalyst substrate having a plurality of channels adapted for gas flow, each channel having a wall surface in adherence to a catalytic coating comprising the catalyst composition of claim 1.

9. The catalyst article of claim 8, wherein the catalyst substrate is a honeycomb comprising a wall flow filter substrate or a flow through substrate.

10. The catalyst article of claim 8, wherein the catalytic coating is present on the catalyst substrate with a loading of at least about 1.0 $g/in^3$.

11. The catalyst article of claim 8, further comprising a platinum group metal.

12. An emission treatment system for treatment of an exhaust gas stream, the emission treatment system comprising:
 i. an engine which produces an exhaust gas stream;
 ii. a three-way catalyst positioned downstream from the engine and in fluid communication with the exhaust gas stream; and
 iii. an SCR catalyst article positioned downstream from the three-way catalyst and in fluid communication with the exhaust gas stream, the SCR catalyst article comprising a catalyst substrate having a plurality of channels adapted for gas flow, each channel having a wall surface in adherence to a catalytic coating comprising a ceria support doped with niobia, and wherein the catalyst article is non-zeolitic.

13. The emission treatment system of claim 12, wherein the SCR catalyst article is substantially free of platinum group metal.

14. The emission treatment system of claim 12, wherein the SCR catalyst article comprises a platinum group metal.

15. The emission treatment system of claim 14, wherein the platinum group metal is present on the catalyst substrate with a loading of at least about 0.5 $g/ft^3$.

16. The emission treatment system of claim 14, wherein the platinum group metal is present on the catalyst substrate with a loading of about 0.5 g/ft3 to about 20 $g/ft^3$.

17. The emission treatment system of claim 12, wherein the catalytic coating further comprises boehmite.

18. The emission treatment system of claim 12, wherein the ceria support of the catalytic coating of the SCR catalyst article comprises at least 99% by weight ceria.

19. The emission treatment system of claim 12, wherein the ceria support of the catalytic coating of the SCR catalyst article comprises about 10% to about 95% by weight ceria and about 5% to about 90% by weight of a further metal oxide.

20. The emission treatment system of claim 19, wherein the further metal oxide is aluminum oxide.

21. The emission treatment system of claim 12, wherein the catalytic coating of the SCR catalyst article comprises a further dopant that is a base metal oxide.

22. The emission treatment system of claim 21, wherein the base metal oxide is chosen from lanthanum oxide, praseodymium oxide, neodymium oxide, yttrium oxide, titanium dioxide, tungsten oxide, iron oxide, copper oxide, manganese oxide, nickel oxide, magnesium oxide, barium oxide, and combinations thereof.

23. The emission treatment system of claim 22, wherein the base metal oxide is chosen from lanthanum oxide, praseodymium oxide, neodymium oxide, yttrium oxide, tungsten oxide, and combinations thereof.

24. The emission treatment system of claim 12, wherein the catalytic coating comprising the ceria support doped with niobia is in a first coating layer, and wherein the catalyst substrate of the SCR catalyst article comprises a second catalytic coating layer.

25. The emission treatment system of claim 24, wherein the second catalytic coating layer comprises a base metal oxide.

26. The emission treatment system of claim 24, wherein the second catalytic coating layer comprises a platinum group metal.

27. The emission treatment system of claim 26, wherein the platinum group metal is present on the catalyst substrate with a loading of at least about 0.5 g/ft$^3$.

28. The emission treatment system of claim 26, wherein the platinum group metal is present on the catalyst substrate with a loading of about 0.5 g/ft$^3$ to about 20 g/ft3.

29. The emission treatment system of claim 24, wherein the first coating layer is a top layer.

30. The emission treatment system of claim 24, wherein the first coating layer is a bottom layer.

31. An SCR catalyst composition, comprising
a ceria support comprising a first dopant that is niobia and, optionally, a second dopant that is a base metal oxide, wherein the ceria support comprises about 10% to about 95% by weight ceria and about 5% to about 90% by weight of a further metal oxide, and wherein the composition is non-zeolitic.

32. The SCR catalyst composition of claim 31, wherein the further metal oxide is aluminum oxide.

* * * * *